United States Patent
Kroeze et al.

(10) Patent No.: US 12,279,348 B2
(45) Date of Patent: Apr. 15, 2025

(54) DRIVER CIRCUIT AND A METHOD OF CONTROLLING A DRIVER

(71) Applicant: SIGNIFY HOLDING B.V., Eindhoven (NL)

(72) Inventors: Zadok Vitalis Socrates Kroeze, Oss (NL); Adam Kurasz, Pila (PL); Tijmen Cornelis Van Bodegraven, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/274,124

(22) PCT Filed: Jan. 21, 2022

(86) PCT No.: PCT/EP2022/051400
§ 371 (c)(1),
(2) Date: Jul. 25, 2023

(87) PCT Pub. No.: WO2022/161880
PCT Pub. Date: Aug. 4, 2022

(65) Prior Publication Data
US 2024/0422876 A1 Dec. 19, 2024

(30) Foreign Application Priority Data
Jan. 28, 2021 (EP) .................................. 21154048

(51) Int. Cl.
*H05B 45/325* (2020.01)
*H05B 45/14* (2020.01)
*H05B 45/382* (2020.01)

(52) U.S. Cl.
CPC ........... *H05B 45/325* (2020.01); *H05B 45/14* (2020.01); *H05B 45/382* (2020.01)

(58) Field of Classification Search
CPC ..... H05B 45/325; H05B 45/14; H05B 45/382
See application file for complete search history.

(56) References Cited

U.S. PATENT DOCUMENTS

| 2003/0117698 | A1 | 6/2003 | Williams et al. |
| 2008/0298784 | A1* | 12/2008 | Kastner ..................... G01P 3/44 388/811 |
| 2013/0082674 | A1 | 4/2013 | Soleno et al. |
| 2013/0193879 | A1* | 8/2013 | Sadwick .............. H05B 45/385 315/307 |

(Continued)

FOREIGN PATENT DOCUMENTS

| EP | 3614548 A1 * | 2/2020 | ............. H02M 1/14 |
| WO | WO-2021169348 A1 * | 9/2021 | |

*Primary Examiner* — Abdullah A Riyami
*Assistant Examiner* — Syed M Kaiser

(57) ABSTRACT

An isolated driver generates a PWM load drive level signal at the primary side and provides this to the secondary side via an optocoupler. Power consumption of the load is also sensed at the primary side. A drive level is sensed at the secondary side and compared at the secondary side with the load drive level to provide an error signal for the primary side controller. A frequency of the PWM load drive level signal is adjusted and the power consumption of the load is monitored in response to the frequency adjustment. The duty cycle of the PWM load drive level signal can then be adapted to compensate for errors introduced by the optocoupler.

14 Claims, 4 Drawing Sheets

(56) References Cited

U.S. PATENT DOCUMENTS

2014/0167634 A1\* 6/2014 Ivankovic .............. H05B 45/10
                                                                         315/210
2014/0265900 A1\* 9/2014 Sadwick .............. H05B 45/395
                                                                        315/200 R \* cited by examiner

DRIVER CIRCUIT AND A METHOD OF CONTROLLING A DRIVER

CROSS-REFERENCE TO PRIOR APPLICATIONS

This application is the U.S. National Phase application under 35 U.S.C. § 371 of International Application No. PCT/EP2022/051400, filed on Jan. 21, 2022, which claims the benefit of European Patent Application No. 21154048.9, filed on Jan. 28, 2021. These applications are hereby incorporated by reference herein.

FIELD OF THE INVENTION

This invention relates to a driver circuit such as a lighting driver, for example it relates to mains isolated lighting drivers, with an isolated output.

BACKGROUND OF THE INVENTION

Isolated driver circuits are well known, for example for driving a load using mains power, but with a user of the load protected from the mains. By way of example, mains isolated lighting drivers are well known. The isolation is typically implemented by a transformer, and in the case of a high frequency switch mode driver, the transformer (in particular the primary side inductance) may be part of the energy tank of the switch mode power converter.

Feedback control is often used to regulate the drive level of a load. For example, lighting drivers require a current control loop in order to regulate the output current and thereby control the light output. Typically, a controller sets an output current set point, and the actual output current is compared with the current set point to generate an error signal. This error signal is used by the controller to implement a feedback control loop.

There are various ways to implement the feedback control loop. The controller is on the primary side of the isolated driver so one approach is to provide a current sensing feedback signal from the secondary side to the primary side. This may for example be achieved using a dedicated transformer. This however adds cost.

An alternative is to perform sensing at the primary side, using signals at the primary side which vary in dependence on the output current at the secondary side, but this is less accurate that an actual measurement of current at the secondary side.

This invention relates to an approach by which a drive level signal is transferred from the primary side to the secondary side. In the case of a lighting driver, this approach (which is in itself known) involves transferring a current set point from the controller at the primary side to the secondary side, in particular using a first optocoupler. The generation of an error signal can then take place at the secondary side, and the error signal can be returned to the primary side, for example using a second optocoupler. This avoids the need for a transformer to provide a current feedback signal.

A drawback of the use of the optocoupler for relaying a load drive level, such as a current set point, is the tolerance of the current transfer ratio. The spread can be more than 200% so that for example a 1 mA input signal to an optocoupler could result in an output current in the range 0.5 mA to 2 mA.

The load drive level, such as a current set point, is for example implemented as a duty cycle signal, so the current level itself does not encode the information being transferred. However, the tolerance of the current transfer ratio still gives an offset in the duty cycle of the extracted PWM signal on the secondary side, as a result of different response times of the circuit components which process the incoming PWM signal. The result is an increased tolerance on the load output, such as the LED current. The current tolerance for LED lighting for example must be maintained within 5% and this is not easy to achieve when transferring a PWM signal (of desired frequency) as a result of the variation in current.

There is a need to improve this type of driver architecture.

SUMMARY OF THE INVENTION

The invention is defined by the claims.

According to examples in accordance with an aspect of the invention, there is provided a driver comprising:
  a primary side circuit;
  a secondary side circuit for driving a load;
  an optocoupler between the primary side circuit and the secondary side circuit; and
  a transformer between the primary side circuit and the secondary side circuit for delivering power to the load, wherein:
  the primary side circuit comprises:
    a controller for providing a PWM load drive level signal, for setting a load drive level, to the secondary side circuit via the optocoupler; and
    a sensing circuit for measuring a signal which represents a power consumption of the load;
  the secondary side circuit comprises:
    a sensor for sensing a drive level of the load; and
    a comparator circuit for comparing the load drive level with the sensed drive level and providing an error signal for the controller; and
  the controller is configured to:
    adjust the frequency of the PWM load drive level signal;
    monitor the power consumption of the load in response to the frequency adjustment; and
    based on the monitoring adapt the duty cycle of the PWM load drive level signal thereby to compensate for errors introduced by the optocoupler.

This driver generates an error signal at the secondary side, and relays it back to the controller at the primary side. The drive level (i.e. a set point for the load) is transferred as a PWM signal via an optocoupler. To compensate for errors introduced to the PWM signal by transmission though the optocoupler, the controller implements a compensation scheme. In particular, by monitoring the power consumption (at the primary side) the effect of changing the PWM frequency is monitored. The invention is based on the realization that a compensation can be derived by monitoring how (in particular whether or not) the power consumption changes in response to a change in PWM frequency. In particular, the errors introduced are typically constant time delay errors so once these errors have been compensated, the PWM signal should remain accurate even at different frequencies.

A second optocoupler is for example provided between the primary side circuit and the secondary side circuit, wherein the comparator circuit is for providing the error signal to the controller via the second optocoupler. Thus, the error signal is fed back to the primary side via an optocoupler.

The controller is for example configured to:
adjust the frequency of the PWM drive level signal between a first, normal operation, frequency and a second frequency; and
adapt the duty cycle of the PWM drive level signal such that the power consumption is the same at the first and second frequencies.

Thus, there is a normal operation frequency, e.g. 400 Hz, and a test frequency, e.g. 800 Hz. The normal operating frequency is desired to be low so that the effect of the current transfer ratio is low, but it is desired to be high to avoid the need for bulky filtering components. Thus, a compromise is found for the frequency of the PWM load drive level signal, typically in the range 100 Hz to 1 kHz.

The controller is for example configured to adjust the duty cycle by adding an offset to the on or off time of the PWM load drive level signal. This added offset corrects for an added offset which results from the component behavior of the optocoupler and its associated circuitry.

The controller is for example configured to adjust the duty cycle periodically, and maintain the offset between the periodic adjustments. The adjustment could be made continuously, but a periodic adjustment reduces the power consumption and the processing resources needed. The adjustment is for example to compensate for ageing (with a timescale of weeks or months) and for temperature effects (with a timescale of minutes). Thus, the periodic adjustment may for example take place with a period between 10 seconds and 10 minutes.

The controller is for example configured to adapt the duty cycle of the PWM drive level signal iteratively. This provides a simple control algorithm with minimal processing requirement.

The sensing circuit may comprise a power metering circuit. This may already be a required part of a driver, so the power consumption monitoring may be achieved with no additional overhead.

The sensing circuit may comprise a current sensor circuit for sensing a current in the primary side circuit. This may be sufficient for a constant voltage point in the circuit, in order to represent power consumption.

Instead, the sensing circuit may comprise a current sensor circuit and a voltage sensor circuit for sensing a current and voltage in the primary side circuit.

The driver for example further comprises a switch mode power converter such as LLC converter. The transformer may then be part of the switch mode power converter. Many known switch mode converter architectures may be used such as buck, boost, buck-boost or flyback converters.

The driver is for example a lighting driver, wherein the load is a lighting load. the load drive level is a current set point for the lighting load, the sensed drive level is a sensed current and the sensor is a current sensor.

The invention also provides a luminaire comprising:
the lighting driver defined above; and
the lighting load.

The invention also provides a method of controlling a driver having a primary side and a secondary side, comprising:
at the primary side, providing a PWM load drive level signal, for setting a load drive level, to the secondary side via an optocoupler;
at the primary side, measuring a signal which represents a power consumption of the load;
at the secondary side, sensing a drive level of the load;
at the secondary side, comparing the load drive level with the sensed drive level and providing an error signal and providing the error signal to the primary side;
adjusting the frequency of the PWM load drive level signal;
monitoring the power consumption of the load in response to the frequency adjustment; and
based on the monitoring, adapting the duty cycle of the PWM load drive level signal thereby to compensate for errors introduced by the optocoupler.

The errors introduced stem from the current transfer ratio of the optocoupler.

The method may comprise:
adjusting the frequency of the PWM load drive level signal between a first, normal operation, frequency and a second frequency; and
adapting the duty cycle of the PWM load drive level signal such that the power consumption is the same at the first and second frequencies.

The method may comprise adjusting the duty cycle by adding an offset to the on or off time of the PWM load drive level signal. The duty cycle is for example adjusted periodically, and the offset is maintained between the periodic adjustments.

The method is preferably for controller a lighting driver, so that the load is a lighting load, the load drive level is a current set point for the lighting load and the sensed drive level is a sensed current.

The invention also provides a computer program to implement the method defined above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
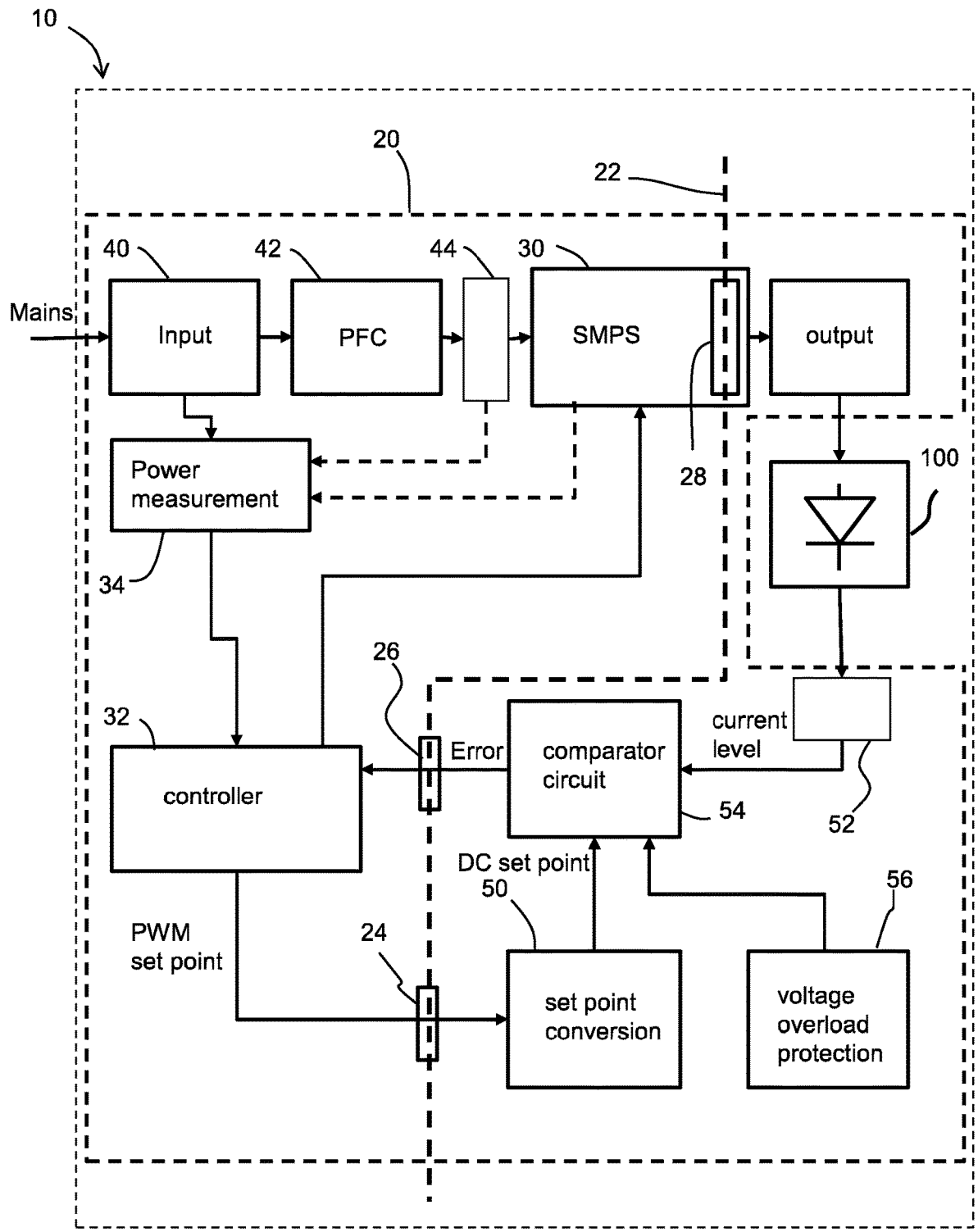
FIG. 1 shows a luminaire comprising a lighting driver and a lighting load.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an isolated driver that generates a PWM load drive level signal (i.e. for providing a set point for the load) at the primary side and provides this to the secondary side via an optocoupler. Power consumption of the load is also sensed at the primary side. A drive level is sensed at the secondary side and compared at the secondary side with the load drive level to provide an error signal for the primary side controller. A frequency of the PWM load drive level signal is adjusted and the power consumption of the load is monitored in response to the frequency adjustment. The duty cycle of the PWM load drive level signal can then be adapted to compensate for errors introduced by the optocoupler.

The invention may be applied generally to any isolated driver with a load at the secondary side and with the load drive level (e.g. a load current or voltage or power) set at the primary side and relayed to the secondary side by an optocoupler. The invention will be described with reference to a lighting driver. In this case, the load is a lighting load, the load drive level is a current set point for the lighting load and the sensed drive level is a sensed current. However, the concept explained below may be applied to driver for other loads and with a different drive level signal relayed from the primary side to the secondary side.

FIG. 1 shows a luminaire 10 comprising a lighting driver 20 and a lighting load 100 in the form of an LED arrangement.

The lighting driver 20 comprises a primary side circuit (all parts to the left of the isolation divide 22) and a secondary side circuit for driving the lighting load 100 (all parts to the right of the isolation divide 22).

A first optocoupler 24 between the primary side circuit and the secondary side circuit is for transferring a current set point signal from the primary side circuit to the secondary side circuit, and a second optocoupler 26 is for transferring a current error signal from the secondary side circuit back to the primary side circuit.

A transformer 28 is between the primary side circuit and the secondary side circuit for delivering power to the lighting load. It is shown as part of a switch mode power converter 30 of the driver.

The main controller 32 controls the timing of switching of the switch mode power converter, in known manner. It also provides a PWM current set point signal, for setting the LED current, and this signal is provided to the first optocoupler 24.

A power measurement circuit 34 measures a power consumption of the lighting load, based on the power drawn from the mains (in that the power consumption of circuitry is trivial compared to the power consumption of the LED arrangement). The power measurement circuit may for example be an energy metering circuit (i.e. a power consumption monitoring circuit). Any signal may be sensed which is indicative of the power consumption, for example a voltage and current measurement, or a current measurement at a constant fixed voltage. As shown by dotted arrows, the power measurement circuit 34 may instead derive a power measurement from many other possible circuit locations and not only from the mains input.

The primary side circuit in the example shown also comprises an input circuit 40, for example for mains rectification and filtering, a power factor correction circuit 42 and a buffer circuit 44. The buffer circuit may for example have a storage capacitor and a current may be measured at the buffer circuit for power monitoring.

The secondary side circuit comprises a set point conversion circuit 50 for recreating the PWM signal at the secondary side and converting the PWM current set point signal to an analog, DC signal. A current sensor 52 senses a current level of the lighting load, and a comparator circuit 54 compares the DC set point (generated by circuit 50) with the sensed current level. The comparator circuit provides the error signal for the controller 32 via the second optocoupler 26.

FIG. 1 also shows a voltage overload protection circuit 56 in the secondary side circuit. The overvoltage protection circuit 56 reduces the output current in such a way that the output voltage remains stable at the given overvoltage level.

To the extent described above, the lighting driver is known. For this reason, the various components will not be described in detail. They are all known conventional circuits and indeed the overall architecture is known.

The invention relates to a method implemented by the controller 32 to compensate for errors that are introduced to the PWM set point signal as a result of the optocoupler 24.

Figure 2:
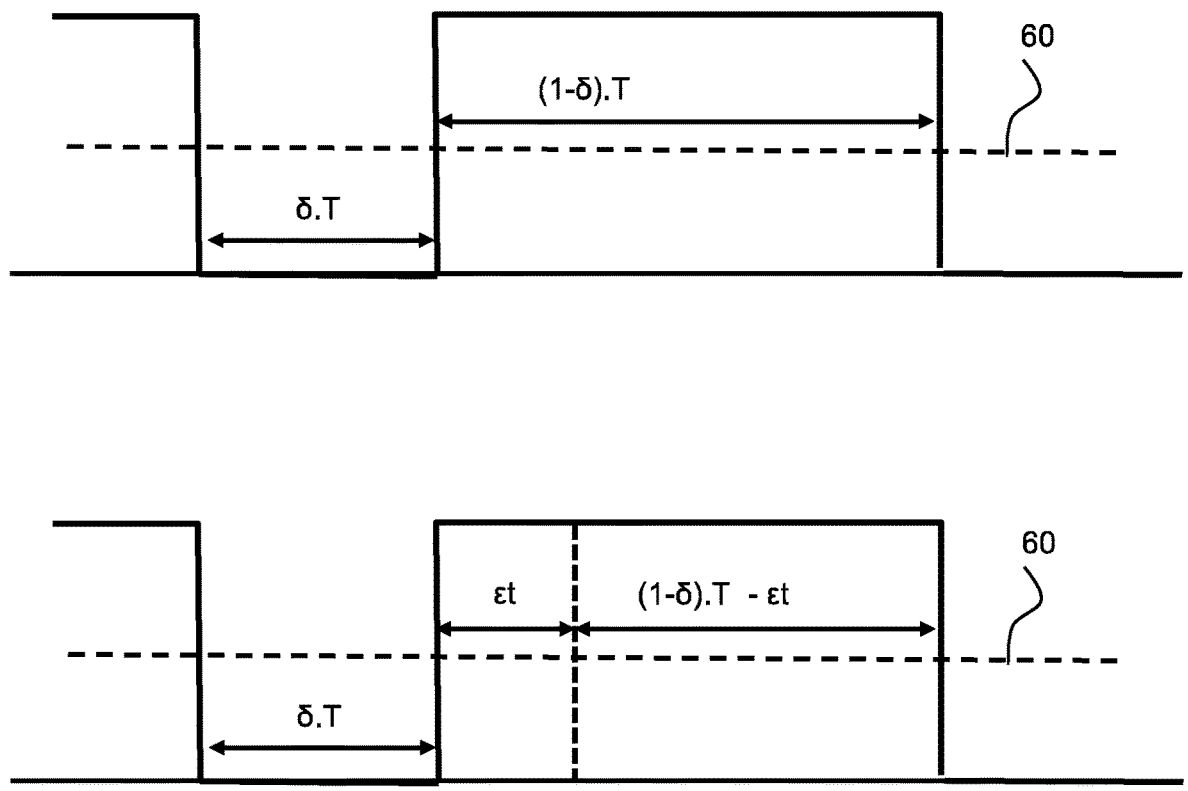
FIG. 2 shows the nature of the error that results from the use of an optocoupler to transfer a PWM current set point signal.

FIG. 2 shows the nature of the error that results.

The top image shows the transmitted PWM current set point signal. It has a period T and a duty cycle of $\delta$ (high for a fraction 1−$\delta$ and low for a fraction $\delta$ in this particular notation).

The average PWM signal level 60 is the set point level for the LED current. This signal is on the primary side of the driver and is:

$$(1-\delta) \cdot V_{cc}$$

Due to the tolerance of the current transfer ratio, there is an error introduced, $\varepsilon t$, as shown in the bottom image. The error means the rising edge from low to high occurs late, at the dotted line. This is the signal received at the secondary side of the driver, after some processing by circuitry associated with the optocoupler. The delay is the result of delays in the components of the circuitry.

The average PWM signal level becomes:

$$(1-\delta) \cdot V_{cc} - \frac{\varepsilon t}{T} \cdot V_{cc}$$

The invention is based on adding a correction factor, $\Delta t$, to the PWM signal at the primary side, so that the error caused by the current transfer ratio can be compensated.

The correction factor results in adaptation of the duty cycle of the PWM current set point signal thereby to compensate for errors introduced by the optocoupler.

If the compensation factor $\Delta t$ makes the transition from low to high earlier by an amount $\Delta t$, it will increase the average PWM signal.

The average compensated PWM signal level becomes:

$$(1-\delta) \cdot V_{cc} - \frac{\varepsilon t - \Delta t}{T} \cdot V_{cc}^5$$

The invention is based on the recognition that the appropriate correction factor can be obtained based on the observation that the average PWM signal will be the same for different values of T only when $\varepsilon t = \Delta t$. Thus, when $\varepsilon t = \Delta t$ the correct average PWM signal of (1−$\delta$). Vcc will be recovered, and it can be determined when this is the case based on analysis using the period T.

Thus, by performing a power consumption measurement (which is dependent on the average PWM signal at the secondary side used to regulate the current output by means of the error feedback) it can be determined if the PWM average has changed in response to a change in the period T.

When εt≠Δt the average PWM signal level will change when the period time, T, changes. This change will give a change in the LED current, which can be detected as a change in the power drawn at the primary side of the driver.

Thus, in response to a detected change in power, the correction factor can be adjusted until there is no change in power when the period time changes.

Thus, the controller 32 adjusts the frequency of the PWM current set point signal and monitors the power consumption of the lighting load in response to a frequency adjustment. Based on the monitoring, the duty cycle is adapted to compensate for errors introduced by the optocoupler.

Figure 3:
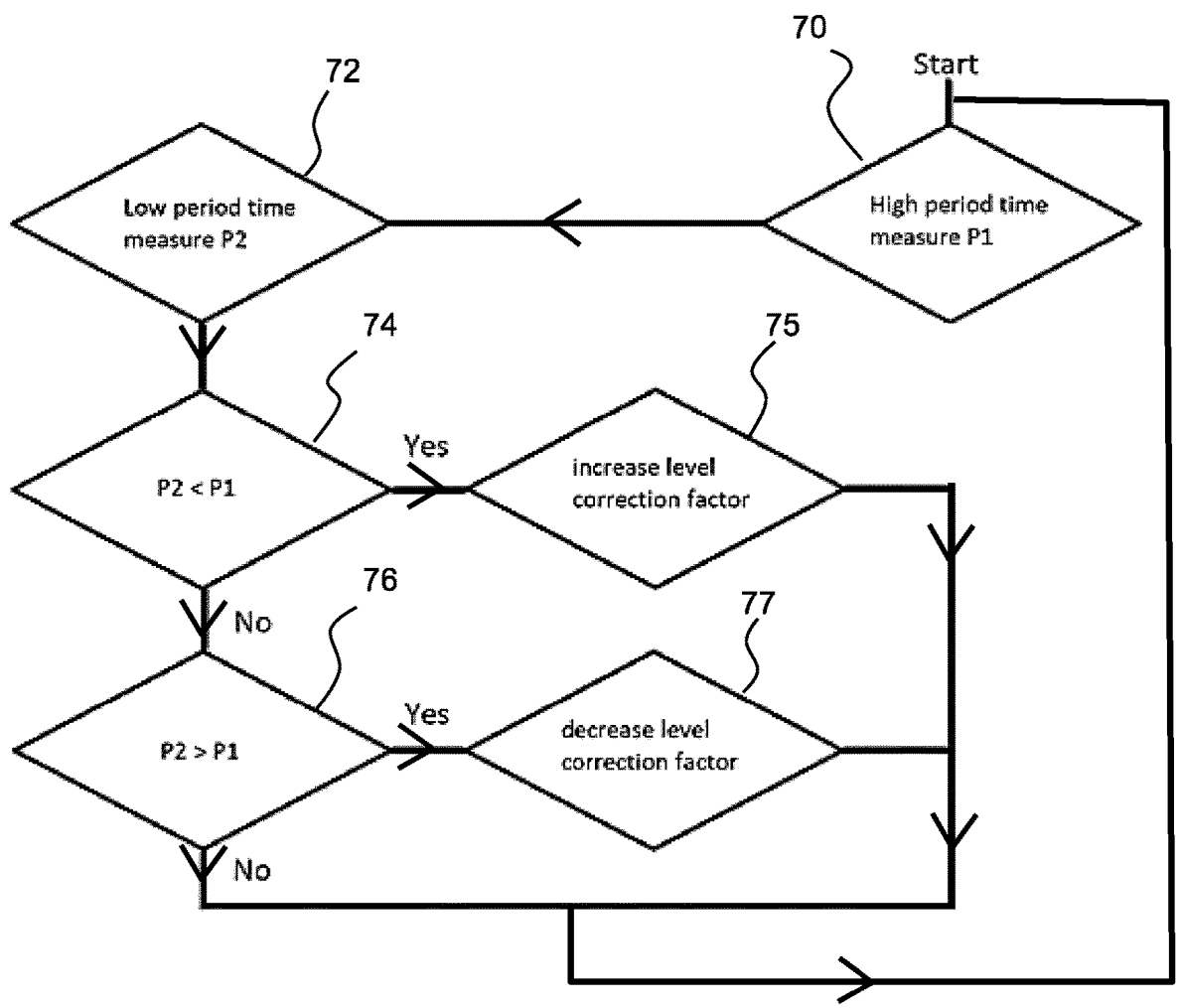
FIG. 3 shows a flow chart for an iterative method for adapting a correction factor.

FIG. 3 shows a flow chart for an iterative method for adapting the correction factor Δt.

At the start, the compensation factor Δt is set to zero, a default value or the last value set when the driver was switched off.

In step 70, the power is measured for the normal default period of the PWM signal, for example corresponding to a frequency of 400 Hz. The measured power is P1.

In step 72, the frequency is changed to a measurement frequency, such as 800 Hz. The power is measured for the new period of the PWM signal. The measured power is P2.

In step 74 a test is made of whether P2<P1. If so, the correction factor is increased by an increment (e.g. 1 μs) in step 75.

In step 76 a test is made of whether P2>P1. If so, the correction factor is decreased by an increment (e.g. 1 μs) in step 77.

If neither is true, i.e. P1=P2, then no adjustments need to be made.

This iterative process may be performed continuously, but a periodic adjustment instead reduces the power consumption and the processing resource. The adjustment is for example to compensate for ageing (with a timescale of weeks or months) and for temperature effect (with a timescale of minutes). Thus, the periodic adjustment may for example take place with a period between 2 seconds and 10 minutes.

As explained above, the second optocoupler 26 transfers the error signal. The bandwidth of the feedback loop including this second optocoupler is for example in the range 2 kHz to 10 kHz, whereas the PWM frequency is for example 400 Hz and 800 Hz.

For the initial frequency of 400 Hz, the complete system needs to stabilize to enable correct power measurement, this may take a time period of the order of a second or seconds. For the measurement frequency of 800 Hz, the complete system also needs to stabilize, which take again takes a similar time.

Thus, the switching frequency of the switch mode power converter is typically greater than 20 kHz, the feedback loop in the secondary side operates between 2 kHz and 10 kHz and the switching between the 400 Hz and 800 Hz frequencies is for example at a rate of 0.5 Hz or lower to reduce the usage of the processing time.

For a 400 Hz signal, the period is 2500 μs, and an adjustment of for example up to 100 1 μs iterations may for example be required to compensate for the error introduced by the optocoupler. More typically, errors up to around 25 μs may be expected.

Figure 4:
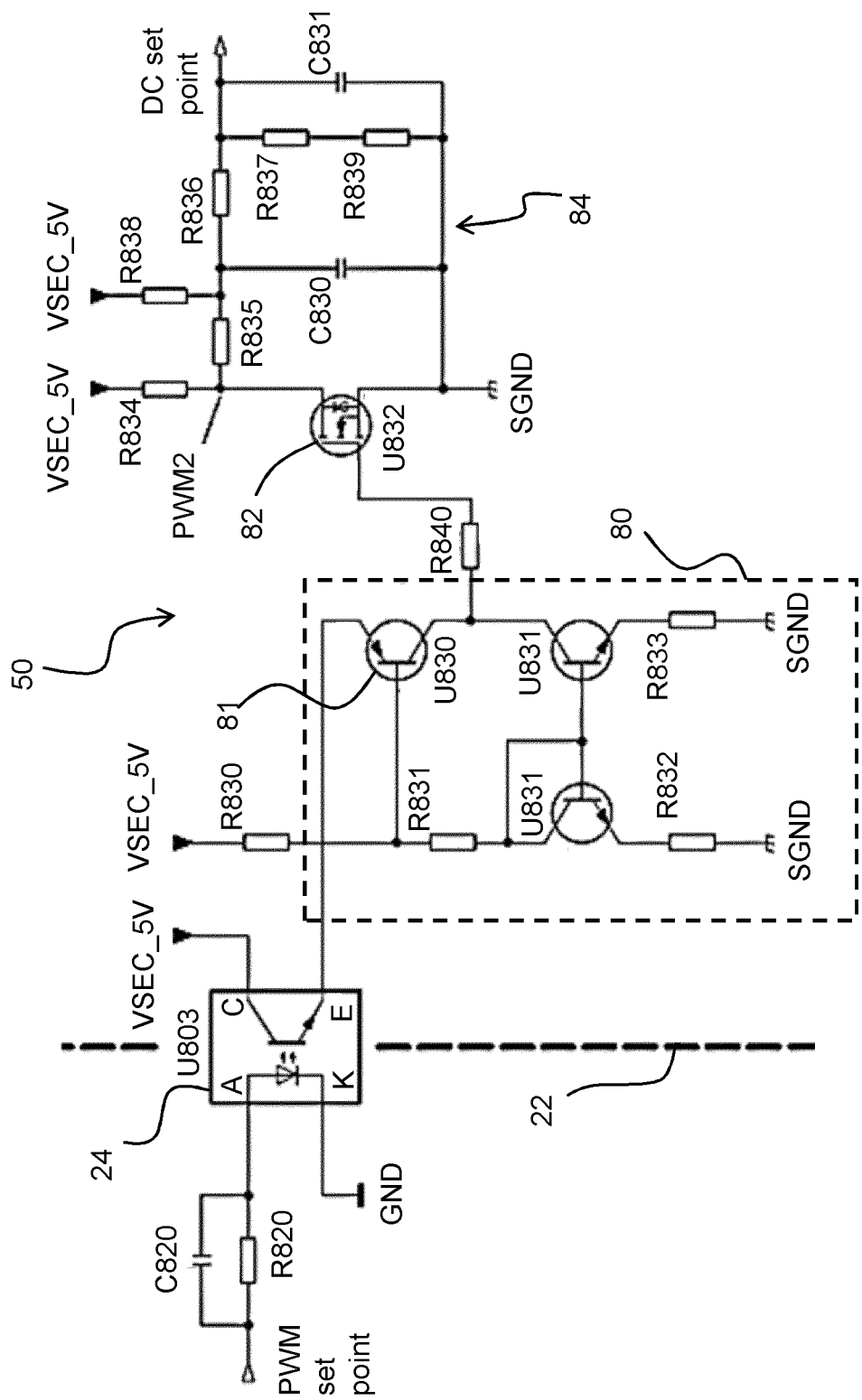
FIG. 4 shows an example of a set point conversion circuit.

FIG. 4 shows an example of the set point conversion circuit 50.

The PWM set point signal at the primary side is a voltage waveform. It is converted by the optocoupler 24 to a current signal.

The current signal is provided to a circuit 80, 82 for reconstructing a PWM voltage waveform. The circuit 80 is a bias circuit for setting the operating point (in particular drain source voltage) of the phototransistor of the optocoupler, in particular to avoid operation in the saturation region. It comprises a current mirror circuit and a feed transistor 81. If the PWM current delivered by the feed transistor exceeds the current mirror current, the MOSFET 82 is turned on. If the current delivered by the feed transistor is insufficient to match the current mirror circuit current, the MOSFET 82 is turned off. The reconstructed PWM signal, PWM2, is at the drain of the MOSFET 82.

It is noted that in this example, due to the MOSFET 82, the PWM transfer has a 180 degree phase rotation. This is compensated by the controller.

A filter circuit 84 then derives a DC set point level as the average level of the PWM2 signal. This DC set point level is used to generate the error signal.

The invention has been shown with reference to one driver architecture, but the invention may be applied to any driver architecture in which there is generation of the current error signal at the secondary side (i.e. secondary side current control) based on a PWM current set point which is transferred via an optocoupler from the primary side to the secondary side (i.e. primary side current setting).

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A driver comprising:
a primary side circuit;
a secondary side circuit for driving a load;
an optocoupler between the primary side circuit and the secondary side circuit; and
a transformer between the primary side circuit and the secondary side circuit for delivering power to the load, wherein:
the primary side circuit comprises:
a controller for providing a PWM load drive level signal, for setting a load drive level, to the secondary side circuit via the optocoupler; and
a sensing circuit for measuring a signal which represents a power consumption of the load;

the secondary side circuit comprises:
  a sensor for sensing a drive level of the load; and
  a comparator circuit for comparing the load drive level with the sensed drive level and providing an error signal for the controller; and
the controller is configured to:
  adjust the frequency of the PWM load drive level signal;
  monitor the power consumption of the load in response to the frequency adjustment; and
  based on the monitoring adapt the duty cycle of the PWM load drive level signal thereby to compensate for errors introduced by the optocoupler,
wherein the controller is configured to:
  adjust the frequency of the PWM load drive level signal between a first, normal operation, frequency and a second frequency; and
  adapt the duty cycle of the PWM load drive level signal such that the power consumption is the same at the first and second frequencies.

2. The driver of claim 1 further comprising a second optocoupler between the primary side circuit and the secondary side circuit, wherein the comparator circuit is for providing the error signal to the controller via the second optocoupler.

3. The driver of claim 1, wherein the controller is configured to adjust the duty cycle by adding an offset to the on or off time of the PWM load drive level signal.

4. The driver of claim 1, wherein the controller is configured to adjust the duty cycle periodically, and maintain the offset between the periodic adjustments.

5. The driver of claim 1, wherein the controller is configured to adapt the duty cycle of the PWM load drive level signal iteratively.

6. The driver of claim 1, wherein the sensing circuit comprises a power metering circuit.

7. The driver of claim 1, wherein the sensing circuit comprises:
  a current sensor circuit for sensing a current in the primary side circuit; or a current sensor circuit and a voltage sensor circuit for sensing a current and voltage in the primary side circuit.

8. The driver of claim 1, further comprising a switch mode power converter such as an LLC converter.

9. The driver of claim 1, comprising a lighting driver, wherein:
  the load is a lighting load;
  the load drive level is a current set point for the lighting load;
  the sensed drive level is a sensed current; and
  the sensor is a current sensor.

10. A luminaire comprising:
  the lighting driver of claim 9; and
  the lighting load.

11. A method of controlling a driver having a primary side and a secondary side, comprising:
  at the primary side, providing a PWM load drive level signal, for setting a load drive level, to the secondary side via an optocoupler;
  at the primary side, measuring a signal which represents a power consumption of the load;
  at the secondary side, sensing a drive level of the load;
  at the secondary side, comparing the load drive level with the sensed drive level and providing an error signal and providing the error signal to the primary side;
  adjusting the frequency of the PWM load drive level signal;
  monitoring the power consumption of the load in response to the frequency adjustment; and
  based on the monitoring, adapting the duty cycle of the PWM load drive level signal thereby to compensate for errors introduced by the optocoupler.

12. The method of claim 11, comprising:
  adjusting the frequency of the PWM load drive level signal between a first, normal operation, frequency and a second frequency; and
  adapting the duty cycle of the PWM load drive level signal such that the power consumption is the same at the first and second frequencies.

13. The method of claim 11, comprising controlling a lighting driver, wherein:
  the load is a lighting load;
  the load drive level is a current set point for the lighting load; and
  the sensed drive level is a sensed current.

14. A non-transitory computer readable medium comprising instructions which, when the instructions are executed by a controller of a lighting driver, cause the controller to perform the method of claim 10.

* * * * *